June 1, 1937.  E. O. SIMPSON ET AL  2,082,662
GLASS MINNOW TRAP AND METHOD OF MANUFACTURING SAME
Filed April 6, 1934    2 Sheets-Sheet 1
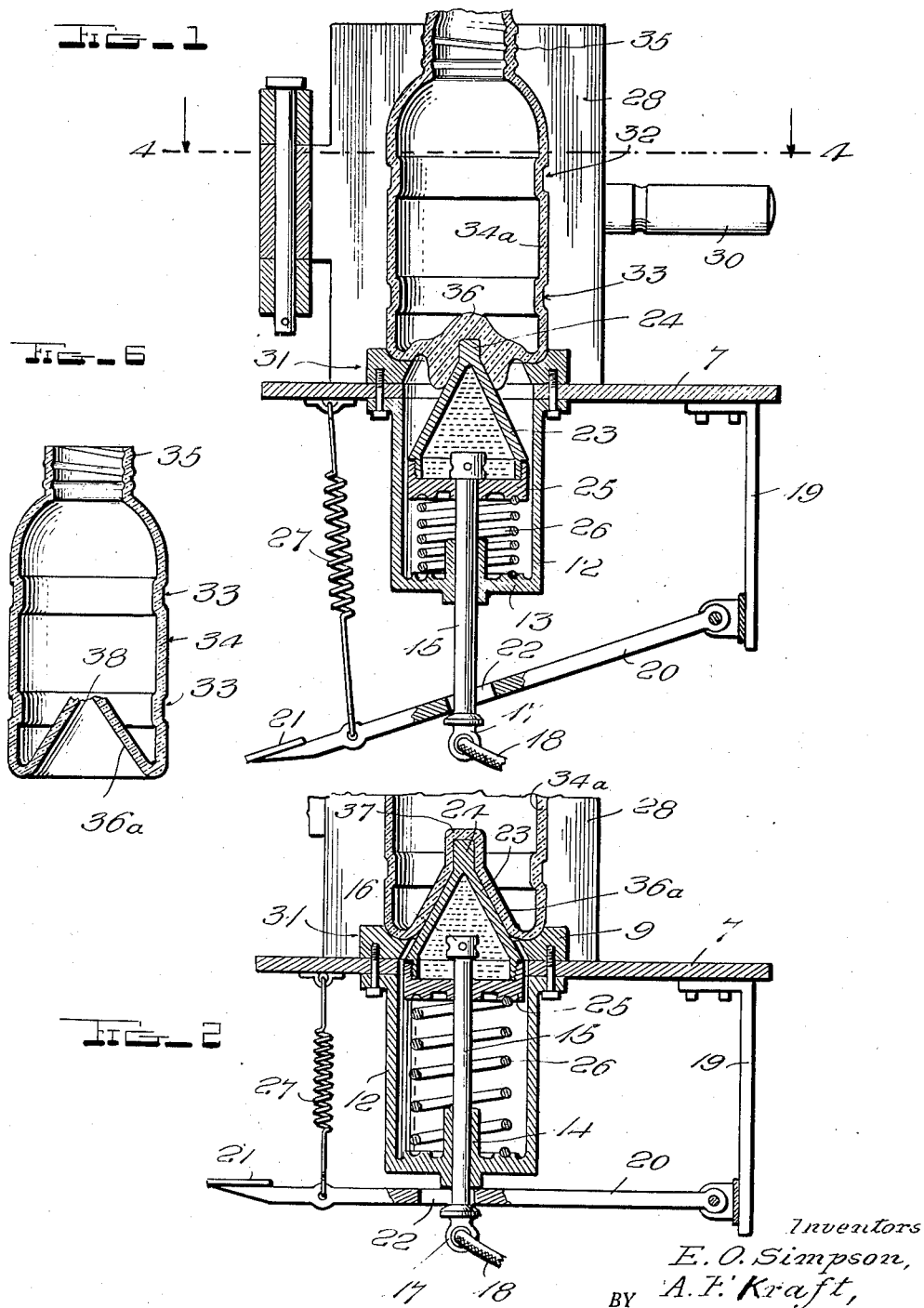
Inventors
E. O. Simpson,
A. F. Kraft,
BY A. R. Townshend Jr.
Attorney

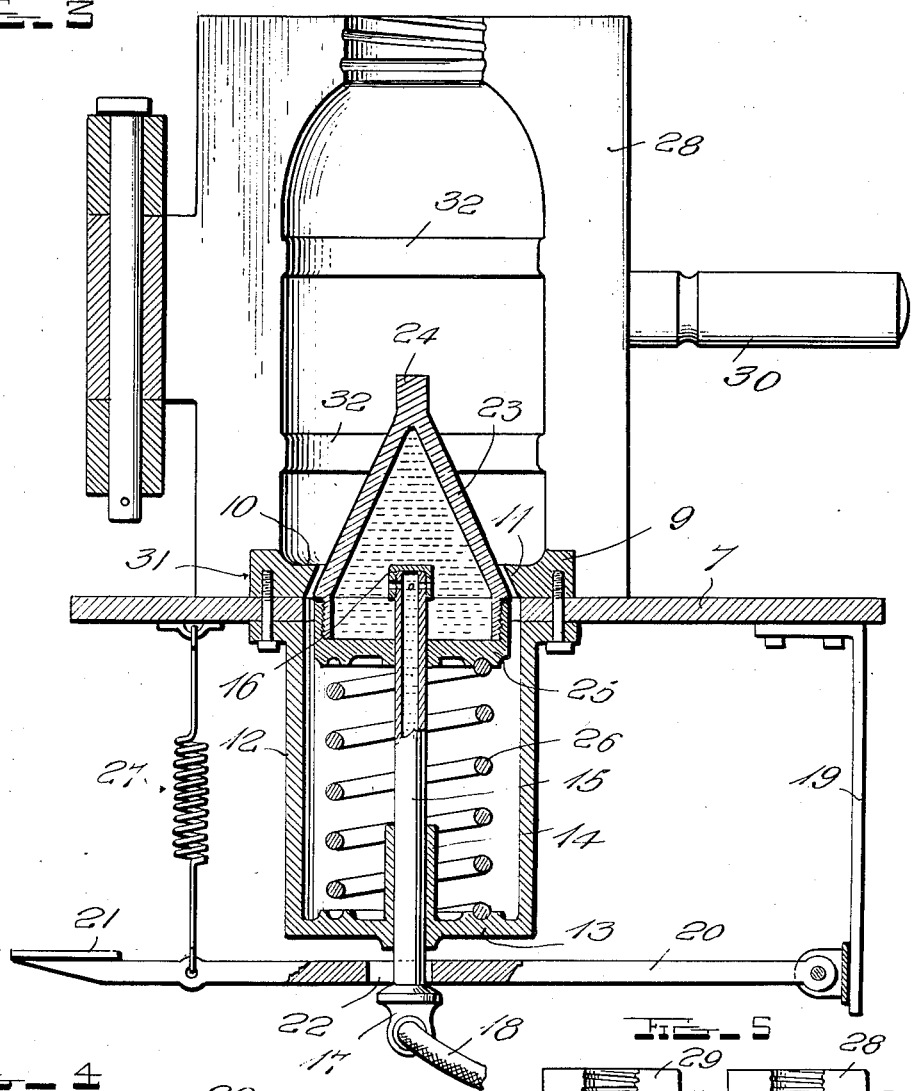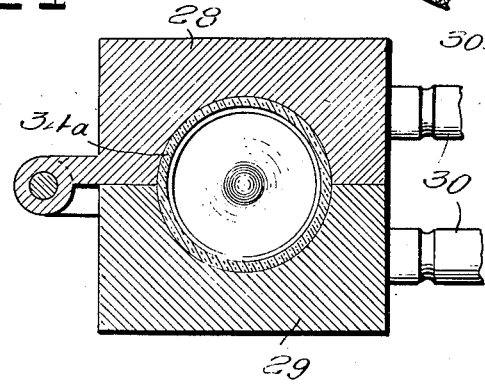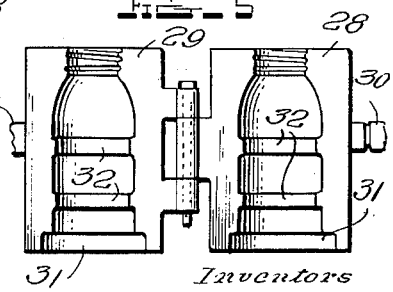

Patented June 1, 1937

2,082,662

UNITED STATES PATENT OFFICE 2,082,662

GLASS MINNOW TRAP AND METHOD OF MANUFACTURING SAME

Ewin O. Simpson and Albert F. Kraft, Fort Smith, Ark.

Application April 6, 1934, Serial No. 719,388

4 Claims. (Cl. 49—69)

Our invention relates to the art of manufacturing articles of blown glass, and has particular reference to the manufacture of glass minnow traps.

An object of the invention is the provision of a method of core-shaping blown glass articles before the material has cooled beyond the plastic stage at the conclusion of a blowing operation. Another object is the provision of a novel method of manufacturing substantially cylindrical glass receptacles whereby they are formed with indented frusto-conical bottoms. A further object resides in the provision of a method of providing glass receptacles with conically indented bottoms having tips open internally thereof. A still further object is the provision of a glass minnow trap having a conically indented portion provided with an aperture at the tip thereof. Other objects will be apparent from the description.

In the drawings:—

Figure 1 is a vertical section, partly in elevation, of an apparatus employed in the practice of the method of this invention, and illustrating the relative position of the elements at the commencement of a blowing operation.

Figure 2 is a view similar to Figure 1, illustrating a step in the method of forming the conically indented bottom.

Figure 3 is a similar view illustrating the normal association of the elements of the apparatus prior to use.

Figure 4 is a section of the mold taken on line 4—4 of Figure 1.

Figure 5 is an elevation of the mold sections as opened.

Figure 6 is a vertical section through a completed article formed in accordance with the method.

The forming apparatus employed in the practice of our invention consists of a support, such as a platform 7, having a circular aperture surrounded by an annular bottom plate 9 that is centrally apertured substantially in conformity with the platform aperture, the plate being disposed on the top face of the platform. The plate 9 is provided with a dished top face 10 and a chamfered inner edge 11.

At its under side the platform carries a depending cylinder 12, the internal diameter of which conforms to that of the platform aperture, with which it registers, the upper end of the cylinder being open. At its bottom the cylinder is provided with a closed end 13 axially apertured in communication with the bore of an internal bushing 14 which receives in vertically slidable relation a pipe 15 having a spray head 16 on its upper end and fixed thereto. The lower end of pipe 15 projects beneath the cylinder bottom 13 an appreciable distance, and is provided with an attached fitting 17 arranged in connection with a flexible water hose 18; the fitting 17 serving as a lateral enlargement on the lower end of the pipe.

At one side of the cylinder 12 the platform 7 has attached thereto a depending bracket 19 to which is pivoted one end of a foot pedal lever 20 having a foot plate 21 on its outer free end. The lever 20 is provided with a longitudinal slot 22 through which the pipe 15 is passed in freely slidable relation, the body of the lever being disposed between the cylinder bottom 13 and the pipe fitting 17. The laterally enlarged fitting 17 provides a pipe carried stop or abutment against which the lever 20 is adapted to bear as the lever is depressed.

The upper end of pipe 15 is slidably received within a hollow conical core member 23 provided at its apex with an axially extending solid cylindrical tip 24. The base of the conical core member 23 consists of a detachable plate 25, between which and the cylinder bottom 13, there is disposed a coiled expansion spring 26 surrounding the stem of the pipe 15, which spring normally maintains the core member 23 at its upper limit of movement with respect to the cylinder, the chamfered edge 11 of the plate 9 providing a stop engaging the core member adjacent its base to limit its upward movement under the expanding action of the coil spring 26.

Adjacent its pedal extremity the foot lever 20 is supported by a spring suspension link 27 connected to the platform and lever. A receptacle mold comprising counterpart hinged sections 28 and 29 provided with handles 30 is adapted to be closed over and around the mold bottom former plate 9, the bottom of each section being formed with an internal conforming recess 31 to receive the plate. The mold sections are further provided on their inner faces with circumferentially disposed internal annular ribs 32 whereby to provide external grooves in the finished article, such grooves being shown as at 33 on the body of the finished article 34 as shown in Figure 6. The mold sections are appropriately formed at their upper ends to provide on the finished article the screw threaded neck 35 conventional to fruit jars, for the reception of a cap, not shown.

In the practice of the method of this invention the elements of the apparatus as described are initially assembled in the relationship as shown in Figure 3, whereupon molten glass is introduced through the top of the mold; the core member 23 being retracted within the cylinder 12 by depression of the foot lever 20, as shown in Figure 1. The glass being substantially in the condition of a heavily viscous semiliquid is somewhat concentrated at, over and around the core tip 24.

A conventional blower, not shown, is then supplied at the mold top and the article is blown in the usual manner to fill out and adhere to the interior face of the mold as shown at 34a in Figure 1 with an excess of material collecting around the apex of the conical core, as shown at 36, Figure 1.

Before the glass has cooled beyond the plastic stage, while it is at a cherry red heat, pressure on the foot pedal lever 20 is gradually released to allow the conical core 23 to rise within the mold under action of the spring 26. As the core rises to its limit of upward travel within the mold it carries with it and evenly distributes the excess material 36, which provides the conically indented bottom 36a having the cylindrical tip 37, as shown in Figure 2.

After the completed article 34, which is in the form of a jar, has been removed from the mold the tip 37 is removed by any suitable means, not shown, leaving an opening 38 at the apex of the indented conical bottom 36a, which provides the minnow entrant aperture of the trap.

In the coring operation accomplished through rising movement of the core member 23, the sticking of glass to the surface of the core is prevented by cooling the core internally with water supplied through hose 18, pipe 15 and sprinkler head 16. The head 16 functions also as an abutment on the pipe which engages the core base plate 25 to retract the core member within the cylinder 12 as the foot pedal lever 20 is depressed to engage the fitting 17 and draw down the pipe 15. Spring link 27 assists the spring 26 in restoring the foot lever to normal position on release of pressure.

We claim:

1. The method of conically indenting the bottom of a glass receptacle, which comprises molding glass in a hollow mold of the desired form provided with a retractible conical core member that is initially retracted free from the mold bottom before pouring, and moving the same core member into the mold while the glass is in a plastic condition prior to its initial cooling.

2. The method of conically indenting the bottom of a glass receptacle, which comprises forming molten glass in a hollow mold having a retractible conical core member that is initially retracted free from the mold bottom before pouring, forcing the same core member slowly up into the mold before the glass has cooled beyond a plastic stage, and forming an opening at the apex of the indented bottom after the glass has cooled.

3. The method of conically indenting the bottom of a glass receptacle, which comprises forming molten glass in a hollow mold open at the bottom, accumulating an excess of glass at and below the mold bottom, conically indenting the excess glass up into the mold through the open bottom thereof before the glass has cooled beyond the plastic stage, allowing the glass thus formed to cool, and removing the glass at the apex of the conical indent.

4. In a glass molding apparatus, coring mechanism comprising a cylinder open at one end, a mold element extending partly across the bore of said cylinder at its open end, a conical core member disposed in said cylinder for movement axially thereof, the base of said core member being adapted to abut said mold element to limit the extent of movement of said core member in one direction, spring means in said cylinder and normally urging said core member into projected position with respect to the cylinder, and means operable axially through said cylinder for retracting said core member thereinto against the tension of said spring means.

E. O. SIMPSON.
ALBERT F. KRAFT.